Oct. 28, 1958
R. H. DICKE
2,858,506
SYSTEM EMPLOYING A MICROWAVE RESONANT
GAS IN A RADIATIVE STATE
Filed Oct. 27, 1953
2 Sheets-Sheet 1
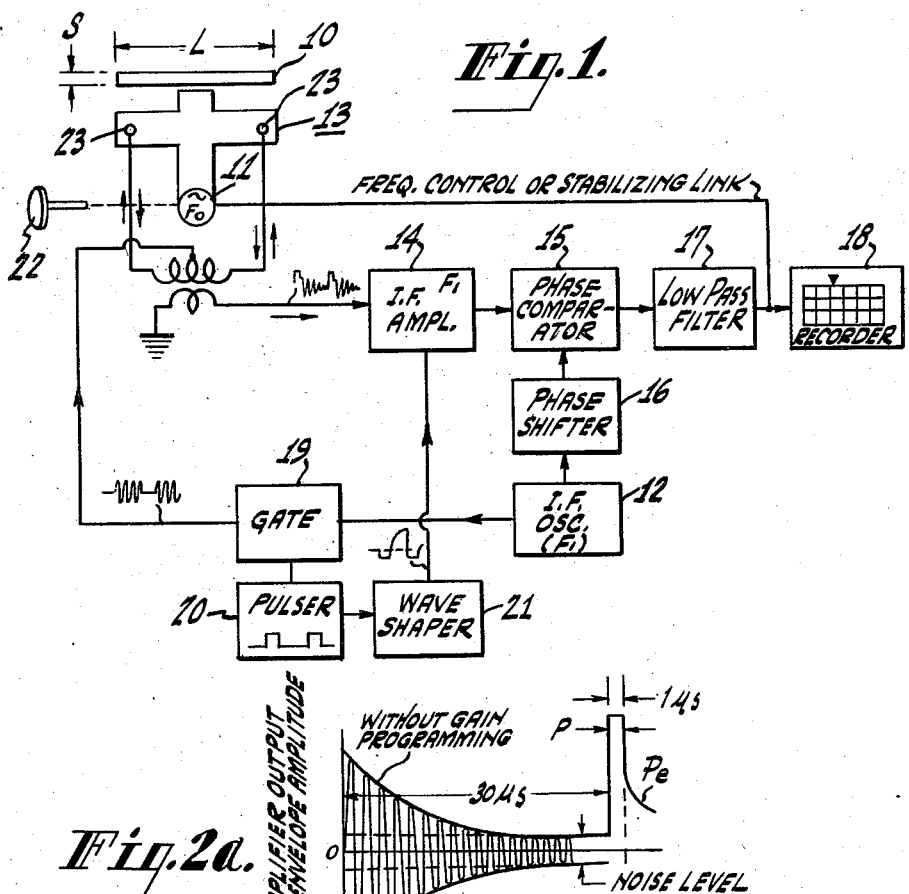
INVENTOR.
ROBERT H. DICKE
BY J. L. Whittaker
ATTORNEY

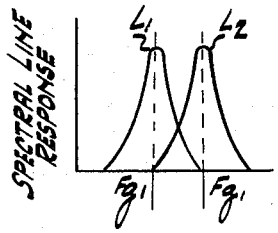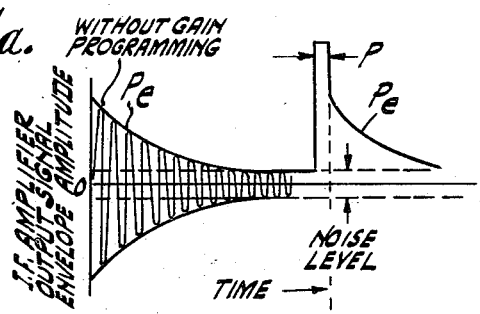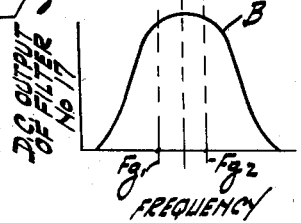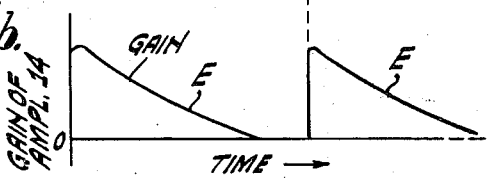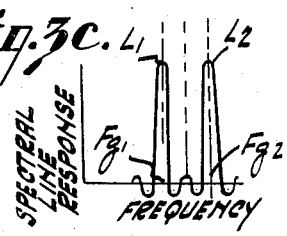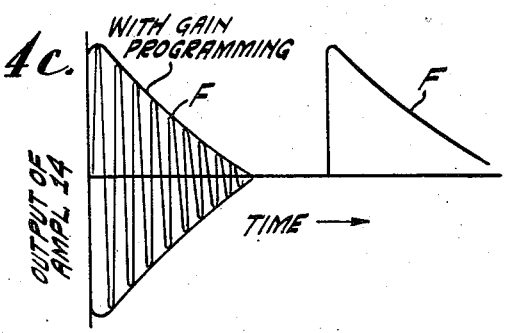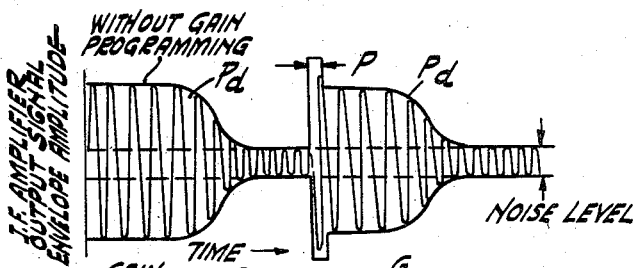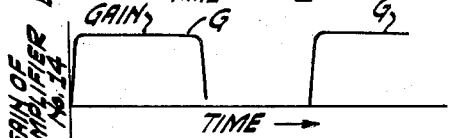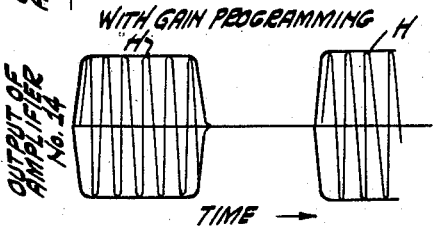

United States Patent Office 2,858,506
Patented Oct. 28, 1958

2,858,506

SYSTEM EMPLOYING A MICROWAVE RESONANT GAS IN A RADIATIVE STATE

Robert H. Dicke, Princeton, N. J.

Application October 27, 1953, Serial No. 388,524

9 Claims. (Cl. 324—58.5)

This invention relates to microwave systems and methods utilizing molecular resonance characteristics of gases, and particularly relates to microwave spectroscopy, and microwave control and frequency stabilization.

An object of the invention is to provide improved and novel methods and apparatus for microwave gas resonance spectroscopy.

Another object is to provide improved and novel methods and apparatus for control and/or stabilization of the frequency of a microwave source.

A further object is to provide improved methods and means for gain programming in electrical control circuits.

Another object is to provide improved methods and apparatus for improving and/or maximizing signal-to-noise characteristics in electrical circuits.

A still further object is to provide improved methods and means for indicating, recording or utilizing the molecular resonance characteristics of a microwave resonant absorption gas.

In accordance with the present invention, pulses of microwave energy are applied to a gas so that the gas molecules, in the interpulse interval, radiate or emit microwave energy at a frequency corresponding with a molecular frequency of the gas. From the energy radiated or emitted by the gas molecules a signal is derived which is variably amplified, during the interpulse intervals, in accordance with a predetermined repetitive time program to obtain an enhanced signal-to-noise ratio or enhanced resolution of spectral lines of the gas.

More particularly, the exciting pulses impressed upon the gas are produced by combining microwave oscillations and intermediate frequency oscillations: the resulting molecular radiation signal and the microwave oscillations are combined to produce a beat-frequency signal which is variably amplified in accordance with the repetitive program. A direct-current signal which may be used for actuating a recorder, or for other control purposes as control of gas composition or frequency of the microwave oscillator, is derived by comparison of the variably amplified beat-frequency signal with a reference signal, preferably the intermediate-frequency oscillations.

For a more detailed understanding of the invention, reference is made to the accompanying drawings in which:

Fig. 1 is a block diagram of a microwave system suited for use in microwave spectroscopy; and Figs. 2A–2C, 3A–3C, 4A–4C, and 5A–5C are explanatory figures referred to in discussion of Fig. 1.

Similar reference characters are applied to similar elements throughout the drawings.

As exemplary of preferred systems for obtaining an enhanced signal-to-noise ratio of gas-echo signals or enhanced resolution of gas lines, reference is made to Fig. 1. Ammonia, ethylchloride, ethyl oxide, carbonyl sulphide or other gas exhibiting molecular resonance when excited at microwave frequencies is confined in cell 10 at suitably low pressure. The gas cell 10 is preferably of the flat cylindrical type, preferably operated in the $TE_{1,1}$ mode, described and claimed in copending application Serial No. 388,523, filed concurrently herewith, of which it is characteristic that the spacing S between opposite extended parallel walls of the cell is $$\frac{n\lambda}{2}$$

and that the dimension L is substantially greater than, and preferably many wavelengths ($\lambda$), (where $\lambda$ is a wavelength at a molecular resonance frequency of the gas and $n$ is unity or other small odd integer).

The gas within cell 10 is periodically subjected to pulses of microwave energy which in the particular system shown in Fig. 1 are provided by periodically combining the outputs of the microwave oscillator 11 and the intermediate-frequency oscillator 12. Preferably, these frequencies are mixed or combined in a balanced modulator 13 of the "Magic Tee" type in which the conjugate arms for the crystal rectifiers 23, 23, or equivalent, differ in electrical length by $$\frac{\lambda}{4}$$

to effect a desired quadrature relationship between the two components of the intermediate-frequency oscillations applied to the crystals 23, 23 and the microwave energy supplied by the microwave oscillator connected to another arm of the Tee. The exciting microwave pulses are very short, and hence the microwave energy impressed upon the gas is a wide band containing a substantial number of discrete frequencies including the sum and difference frequencies of the oscillators. Each pulse excites the gas molecules into states for which they possess oscillating electric dipole moments and such oscillation continues until the molecules in turn collide with walls of the gas cell. Preferably, the product of pulse duration and electric field strength intensity is such that a molecule is excited from a given energy state into a state for which it is partially in said given state but simultaneously with equal probability in another energy state. This so called superposition state is characterized by the occurrence of an oscillating electric dipole moment in the molecule. In thermal equilibrium the lower of the two energy states has a higher probability of being occupied by a molecule. Consequently, the gas as a whole possesses an oscillating dipole moment when it is excited by the pulse. Such an oscillating electric dipole radiates at the oscillation frequency. In the preferred type of cell, a selected class of molecules, i. e., those moving parallel to the extensive upper and lower walls, continues to radiate at a molecular resonance frequency $F_g$ of the gas for an appreciable number of cycles until collision with the remotely spaced end walls of the cell. The frequency $F_g$ of the 3, 3 line of ammonia is 23.8701 kilomegacycles.

Such radiation after termination of an exciting pulse constitutes a molecular radiation or molecular emission signal which during the intervals between successive pulses is combined with the microwave oscillations of frequency $F_0$ to produce, as demodulated by the crystals 23, 23, a beat-frequency signal $F_b$, where $F_b = (F_0 \pm F_g)$. By way of specific example, the exciting pulse may be of about one microsecond duration and the interval between pulses about 30 microseconds. In general, for optimum results, the pulse repetition rate should be as high as possible consistent with the decay envelope of the molecular radiation signal.

The beat-frequency signal is impressed upon an intermediate-frequency amplifier 14 which selectively passes a band of frequencies including frequency $F_1$, which may, for example, be of the order of 30 megacycles. For reasons which later appear, this frequency is the frequency of oscillations generated by the intermediate-frequency oscillator 12.

The output signal of amplifier 14 is impressed upon one input circuit of a phase-comparator 15 having another input circuit upon which is impressed a reference signal of fixed amplitude, frequency, and phase. The phase comparator 15 preferably is of the type disclosed in a copending application Serial No. 198,541, filed December 1, 1950 by L. E. Norton, now Patent No. 2,695,361. Preferably, and as shown in Fig. 1, the reference signal is provided by the intermediate-frequency oscillator 12, the phase-shifter 16 being provided when necessary to effect quadrature relationship of the reference signal and the $F_1$ component of the output signal of amplifier 14.

For the moment assuming that the output of amplifier 14 consists solely of such component $F_1$, the output of the phase-comparator 15 is a direct-current signal whose amplitude and polarity corresponds with the vector sum of the two input signals. Since the output signal of amplifier 14 includes frequency components other than $F_1$, the output circuit of phase-comparator 15 preferably includes a low pass filter 17 to minimize them.

With the arrangement as thus far described, the output signal envelope of amplifier 14 corresponds in shape with the decay envelope of the gas radiation signal. The shape of the decay envelope is affected by such factors as the pressure of the gas within cell 10 and the Doppler effect encountered in use of large cavities or cells. For higher gas pressures, of the order of 1 millimeter of mercury, the echo signal may be rather quickly damped because of intermolecular collisions: at lower gas pressures of the order of $10^{-3}$ millimeters of mercury, the gas radiation signal may be less rapidly damped because of wall collision. In such cases, the output envelope of amplifier 14, in absence of the present feature of this invention, is generally of the shape of the curves of Figs. 2A and 4A, i. e., the signal-amplitude is initially large and rapidly decays to a finite level corresponding with noise inherently present in the receiving system. Thus, as each interpulse interval progresses, the output signal of amplifier 14 includes an increasingly larger percentage of noise containing no useful information concerning characteristics of the gas, and during the latter portion of each interpulse interval, the output signal contains noise only. With large cavities not dimensioned, as in the preferred type of gas cell, for coherent radiation from a selected class of molecules, the signal level may remain high for a substantial fraction of the interpulse interval and then drop fairly rapidly to the noise level (Fig. 5A). Furthermore, if as shown in Fig. 3A the gas has two closely adjacent spectral lines $L_1$, $L_2$ at frequencies $F_{g1}$ and $F_{g2}$, the direct-current output of phase-comparator filter combination 15, 17, as recorded over this portion of the frequency spectrum is a single, rather blunt curve B (Fig. 3B) which does not properly resolve, and in fact, masks the spectral lines $L_1$, $L_2$ in this portion of the spectrum. The present invention is particularly concerned with extracting the desired information from the gas radiation signal despite the factors above discussed.

For enhanced resolution of spectral lines of the gas, the gain of amplifier 14 may be varied in each of the interpulse intervals generally in accordance with the shape of the gain curve C of Fig. 2B. Specifically, at the beginning of the radiation signal $P_e$, or upon termination of an exciting pulse P, the gain of amplifier 14 is low and is thereafter progressively increased during a substantial percentage of the interpulse interval to a suitable maximum. The gain is then sharply reduced to a minimum or zero value at a time $T_1$ in the interpulse interval when the signal-to-noise ratio is not less than about unity. Thus, the amplitude of the decaying output signal of amplifier 14 is maintained at a high level throughout the operating period of the amplifier within the interpulse interval. Specifically, the gain-control curve C may be so shaped (Fig. 2C) that the amplitude of the output signal D is substantially constant during an interpulse interval. With the gain of amplifier 14 so controlled, the closely spaced spectral lines $L_1$, $L_2$ (Fig. 3A) are recorded (Fig. 3C) as two sharply distinct lines rather than as a single broad line (Fig. 3B).

When it is desired to maximize the signal-to-noise ratio, the gain of amplifier 14 may be varied during each interpulse interval generally in accordance with curve E of Fig. 4B of which it is characteristic that the gain rises rapidly to a maximum early in the interpulse interval and then progressively decreases with a return to zero suitably before the signal-to-noise ratio becomes unity. With the gain so controlled, the output signal of amplifier 14 as delivered to the phase-comparator 15 is generally of the shape of curve F of Fig. 4C.

With large cells or cavities, the signal/noise ratio may be maximized by varying the gain of amplifier 14 generally in accordance with curve G of Fig. 5B of which it is characteristic that the gain rises sharply to a maximum at the beginning of the interpulse interval and remains at high value with abrupt return to zero at about the knee of the decay portion of curve $P_d$ (Fig. 5A). With the gain so controlled, the output signal of amplifier 14 is generally of the shape of curve H, Fig. 5C.

With the preferred form of apparatus shown in Fig. 1, programming of the amplifier gain during the interpulse intervals is effected by deriving gain control pulses from the output of pulser 20. The pulser 20 also is used periodically to open the gate 19, for example, by changing the instantaneous bias level applied to the gate. Each output pulse of pulser 20 opens the gate 19 for a brief time, for example, a microsecond, so that during this time the microwave-frequency oscillations and the intermediate-frequency oscillations are combined as above described to provide an exciting pulse P for the gas in cell 10. In another path, the output pulses of pulser 20 are shaped by waveshaper 21 first to block the amplifier 14 during the duration of an exciting pulse P and then to vary the gain during the following pulse excitation-gas radiation interval in accordance with the desired program as discussed in connection with Figs. 2B, 4B, and 5B. In short, the pulser 20 and waveshaper 21 provide gain control pulses of the same repetition rate as the exciting pulses for the gas and produce them in synchronized time relation to the exciting pulses. The pulser 20 and waveshaper 21 may be of any suitable known types, for example as shown and described in Patent No. 2,474,875 issued on July 5, 1949, to G. E. White. The circuit parameters of the waveshaper 21 may be adjustable so that the same waveshaper may be set in accordance with the desired gain program for a particular use of the system.

In microwave spectroscopy and as schematically shown in the system of Fig. 1, the frequency of the microwave oscillator 11 may be varied as by knob 22 to sweep over a range of frequencies including the spectral line or lines of interest. This control may be of any known type: for some types of tubes, for example, a tunable klystron, the control 22 may change cavity resonator dimensions whereas in other microwave oscillator systems the control 22 may vary the bias of a reactance tube included in the microwave oscillator system. In any event, the control 22 may be varied to sweep the frequency of the oscillator 11 so as to plot the gas spectrum within a range of microwave frequencies.

The direct-current output of phase-comparator 15 may be used for other control purposes. In frequency stabilization applications the control knob 22 and structure associated therewith is disengaged from the system and the output of filter 17 is applied via a stabilizing link or feedback loop to stabilize the frequency of the oscillator 11. Alternatively, in monitoring for processes involving control of gas composition, the direct-current signal may be used to vary a valve in a gas supply line as in copending Hershberger application Serial No. 596,242, filed May 28, 1945, now Patent No. 2,792,548. In such case a sample of the gas or gas mixture is caused to flow through the gas cell 10 and the frequency of microwave oscillator 11 may be left at a value $F_0$ which differs from a molecular resonant frequency of the gas by an amount rather closely corresponding with the intermediate-frequency $F_1$. For rigid stabilization of the frequency of oscillator 11 at a frequency differing from a molecular resonant frequency of the gas by frequency $F_1$, the direct-current output of the phase-comparator 15 may be used, generally as in copending Hershberger application Serial No. 786,736, filed November 18, 1947, now Patent No. 2,702,350, as a control signal for the frequency-control electrode of the microwave oscillator tube or as a control signal for a reactance tube associated with the microwave oscillator tube.

What is claimed is:

1. A microwave system comprising a cell for containing a microwave resonant gas, means coupled to said cell for periodically applying pulses of microwave energy to said cell repeatedly at a frequency for which said gas is resonant to produce in the intervals between successive pulses a gas radiation signal during the interpulse interval of frequency corresponding with a molecular resonance frequency of the gas, a receiver coupled to said cell responsive to said gas radiation signals, and means coupled to said receiver for periodically varying the gain of said receiver as a predetermined function of time during the intervals between the successive pulses of microwave energy.

2. Apparatus as in claim 1 in which in each interval the amplification is initially high and later decreased to enhance the signal/noise ratio.

3. Apparatus as in claim 1 in which the amplification is progressively increased in each interval for individual plotting of closely spaced spectral lines.

4. A microwave system as in claim 1 additionally including means for producing a reference signal of fixed frequency and amplitude, and a phase-comparator coupled to said reference signal producing means and said receiver upon which said reference signal and the output of said receiver are impressed to produce a direct-current control signal.

5. A microwave system as in claim 4 including means responsive to said control signal for stabilizing the frequency of said microwave energy.

6. A microwave system comprising a cell for containing a molecular resonant gas, an oscillator for generating microwave oscillations, an oscillator for generating intermediate-frequency oscillations, means coupled to said oscillator for combining said microwave oscillations and said intermediate-frequency oscillations including means for periodically applying exciting pulses containing the algebraic sum of the frequencies of said oscillators to the gas in said cell to produce a gas radiation signal in the interpulse interval of frequency corresponding with a molecular resonance frequency of the gas and for combining the gas radiation signal with said microwave oscillations periodically to produce a beat-frequency signal in the intervals between said exciting pulses, an intermediate-frequency amplifier coupled to said beat-frequency producing means for amplifying said beat-frequency signal, means coupled to and synchronized with the pulse generating means for periodically varying the gain of said amplifier as a predetermined function of time during said intervals, and a phase-comparator coupled to said intermediate-frequency amplifier and said intermediate-frequency oscillator for combining the outputs of said intermediate-frequency amplifier and said intermediate-frequency oscillator to produce a direct-current control signal.

7. A microwave system comprising a cell for containing gas, a microwave mixer connected to said cell, a microwave oscillator connected to said mixer, an intermediate frequency oscillator, a gate in circuit between said intermediate-frequency oscillator and said mixer, a phase-comparator connected to said intermediate-frequency oscillator, an intermediate-frequency amplifier connected between said mixer and said phase-comparator, a pulser coupled to and for periodically opening said gate, and a waveshaper in circuit between said pulser and said amplifier to vary the amplifier gain as a predetermined function of time in the intervals for which said gate is closed.

8. A microwave system comprising a cell containing a gas capable of exhibiting molecular resonance, means coupled to said cell for intermittently applying exciting pulses of microwave energy to said gas at a frequency for which said gas is resonant to produce a gas radiation signal during the interpulse interval of frequency corresponding with a molecular resonance frequency of said gas, and means coupled to said cell for utilizing said radiation signal.

9. A microwave system comprising a cell containing a gas capable of exhibiting molecular resonance, means coupled to said cell for intermittently applying pulses to said gas at a frequency for which said gas is resonant for exciting the molecules of said gas so that said molecules possess oscillating dipole moments, and means coupled to said cell for deriving from said gas during the interpulse interval electrical energy at a frequency corresponding to a molecular resonance frequency of said gas.

References Cited in the file of this patent

UNITED STATES PATENTS

| | | |
|---|---|---|
| 2,457,673 | Hershberger | Dec. 28, 1948 |
| 2,474,875 | White | July 5, 1949 |
| 2,532,817 | Lafferty et al. | Dec. 5, 1950 |
| 2,591,257 | Hershberger | Apr. 1, 1952 |
| 2,602,835 | Hershberger | July 8, 1952 |
| 2,630,472 | McArthur | Mar. 5, 1953 |